(12) United States Patent
Pooni et al.

(10) Patent No.: US 6,934,711 B2
(45) Date of Patent: Aug. 23, 2005

(54) METHOD AND ARRANGEMENT FOR COMMUNICATING WITH SCSI DEVICES

(75) Inventors: Subramaniyam Pooni, Ventura, CA (US); Rajkumar Mangalore, Bangalore (IN); Vijay Srinath, Bangalore (IN); Vikram Krishnamurthy, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 456 days.

(21) Appl. No.: 10/260,412

(22) Filed: Oct. 1, 2002

(65) Prior Publication Data

US 2004/0064460 A1 Apr. 1, 2004

(51) Int. Cl.$^7$ .......................... G06F 17/00; G06F 3/00; G06F 13/12; G06F 13/20
(52) U.S. Cl. .............................. 707/100; 707/1; 710/62; 710/313; 710/9
(58) Field of Search .................................. 707/1–3, 100, 707/200; 710/9–10, 56, 62, 72

(56) References Cited

U.S. PATENT DOCUMENTS

| | | | | |
|---|---|---|---|---|
| 6,047,332 A | * | 4/2000 | Viswanathan et al. | 709/245 |
| 6,538,669 B1 | * | 3/2003 | Lagueux et al. | 715/764 |
| 6,654,830 B1 | * | 11/2003 | Taylor et al. | 710/74 |
| 2003/0130833 A1 | * | 7/2003 | Brownell et al. | 703/23 |

* cited by examiner

Primary Examiner—Alford W. Kindred

(57) ABSTRACT

A method and arrangement, for use in a system having a host and one or more small computer system interface (SCSI) devices, are described for enabling a user application accessing the system to communicate with one or more of the SCSI devices. The method and arrangement serve to overcome a device node limitation observed in standard Linux, which limits the number of devices a user application may communicate with to 128 SCSI disk (sd) devices or 256 SCSI generic (sg) devices. The method and arrangement provide a pass through capability by allowing the user application to directly talk to any SCSI device by using virtual handles, thereby overcoming the device node limitation observed in standard Linux.

21 Claims, 2 Drawing Sheets

METHOD AND ARRANGEMENT FOR COMMUNICATING WITH SCSI DEVICES

BACKGROUND

In a Linux or UNIX operating system (OS) everything that accepts or sends data to or from the operating system is considered to be a "device". Common devices include terminals, hard disks, printers, CD drives, and modems. A rule of thumb is that anything used for input, storage, or handling of data in an OS is considered a device and needs a device entry so that it may be detected by the OS.

All devices communicate in one of two ways; either one character at a time, or as a complete set of data in a predefined block. Therefore, devices can be classified as being either "character mode" or "block mode". Terminals, printers, and modems are character devices since they handle data one character at a time. Hard drives and tape drives use blocks to transmit data as large chunks of information so they are block mode devices. Some devices function in either mode using two different device drivers.

Each of these devices may also be SCSI devices. SCSI (small computer system interface) is a family of standards that connects components via a parallel bus for system-level interfacing between a computer and intelligent devices such as hard disks, floppy disks, CD ROMs, printers, scanners and other types of media devices or storage devices. SCSI can connect multiple devices to a single adaptor (e.g., a host bus adapter (HBA) or port) on a SCSI bus. SCSI devices transfer bits in parallel and can operate in either asynchronous or synchronous modes.

A device driver is a software module that is part of the kernel and that supports access to a peripheral device. A device driver is a collection of subroutines and data within a kernel (a kernel is the core software of an OS) that constitutes the software interface to an I/O device. In Linux, when a device needs to be accessed the Linux kernel passes an I/O request to the device driver, which handles the communication with the device. Special device files (hereafter "device files") are used to access devices which are connected to a Linux system, devices such as printers, tape drives, terminals and disk drives used for file system storage. Device files are kept in what is called a /dev directory and are given device file names representative of their function, such as "/dev/fd0" for a floppy drive, for example. A device file may be type c (for "character" devices, devices that do not use a buffer cache) or type b (for "block" devices, which go through a buffer cache). In Linux, all disks are represented as block devices only.

Device numbers allow the operating system to differentiate between the devices. In a standard Linux implementation, each device is assigned a major number and a minor number. The major number identifies the driver, while the minor number identifies the instance of the device. For example, the device file name "/dev/fd0" identifies the first floppy drive on a system, with "fd" representing the major number, and "0" representing the minor number of the device file name. Before discussing major and minor numbers in greater detail, however, the Linux SCSI I/O Subsystem driver architecture and SCSI addressing in Linux is briefly explained.

Driver Architecture Overview.

FIG. 1 illustrates a driver architecture for the Linux SCSI I/O Subsystem. The Linux SCSI I/O subsystem (hereinafter SCSI subsystem) has a three (3) level driver architecture with the "upper" level layer 100 being closest to a user space/kernel space interface 110, while the "lower" level layer 150 is closest to hardware (e.g., physical SCSI device, not shown). The upper level drivers (ULDs) in upper level 100 are commonly known by a terse two letter abbreviation (e.g. "sd" for SCSI disk driver, "st" for SCSI tape driver, "sr" for SCSI CD-ROM driver; and "sg" for a SCSI generic driver). The names of the corresponding module drivers which, for historical reasons, sometimes differ from the built-in driver names are shown in brackets in FIG. 1.

The ULDs in upper level layer 100 maintain the kernel side of the Linux OS's user-kernel interface for the logical class of devices they represent (e.g. disks). They are also responsible for managing certain kernel and SCSI subsystem resources such as kernel memory and SCSI command structures. Applications in the user space (e.g., user daemons) access these ULDs by opening a device file (block or char) typically found in the /dev directory tree.

Accordingly, the upper level layer 100 supports the kernel/user interface. For example, in the case of sd (disk) drivers and sr (CD-ROM) drivers, the kernel/user interface is a block device interface, while for st (tape) drivers and sg (generic) drivers, the kernel/user interface is a character device interface. Devices can be classified as being either "character mode" or "block mode". Terminals, printers, and modems are character devices since they handle data one character at a time. Hard drives and tape drives use blocks to transmit data as large chunks of information so they are block mode devices. Some devices function in either mode using two different device drivers.

The mid-level SCSI layer 125 is common to all operations. The mid-level SCSI layer 125 defines internal interfaces and provides common services to the upper and lower level drivers. IOCTLs (input/output control commands) provided by the mid-level SCSI 125 layer are available to file descriptors belonging to any of the four ULDs (sd, sr, st, sg device drivers). Any operation using the SCSI subsystem (e.g. reading a sector from a disk) involves one driver at each of the three levels, e.g. sd drivers at upper level 100, SCSI mid-level driver at SCSI mid level layer 125 and an HBA driver of lower level layer 150.

SCSI Subsystem Addressing.

Linux has a four level hierarchical addressing scheme for SCSI devices: (a) SCSI adapter number [host]; (b) channel number [bus]; (c) ID number [target]; and (d) LUN [lun]. The term "LUN" is a common SCSI abbreviation of Logical Unit Number. The LUN identifies the logical unit within a SCSI target device. A SCSI target device is a SCSI device containing logical units (LUs) that service commands from a SCSI initiator device in order to carry out a specified task for example. As is known, a logical unit may be defined as addressable blocks of storage created from one or more disks (also called spindles) contained within a SCSI device. A logical unit may provide a unique connection to an application program or another SCSI device. "Bus" is used herein in preference to "channel" in the description below.

The SCSI adapter number is typically an arbitrary numbering of adapter cards on internal I/O SCSI buses (e.g. PCI, ISA, etc.) of a computer (Linux host) running the Linux OS. Such adapters are commonly referred to as host bus adapters (HBAs). HBA numbers are issued by the Linux kernel in ascending order, starting with 0 and proceeding for N HBAs. Each HBA may control one of more SCSI buses.

Each SCSI bus can have multiple SCSI devices connected to it. In SCSI parlance, the HBA may be called the "initiator" (e.g., it may be an HBA of a SCSI initiator device) and takes up one SCSI ID number (typically the number "7"). The initiator talks to targets, commonly also known as SCSI target devices (e.g. disks), as briefly discussed above.

On SCSI parallel buses, the number of SCSI IDs are related to the width of the bus. For example, 8-bit buses (sometimes called "narrow" SCSI buses) may have 8 SCSI IDs, of which one ID is taken by the HBA, leaving 7 IDs for SCSI devices. Wide SCSI buses are 16 bits wide and can have a maximum of 15 SCSI devices (e.g., targets) attached.

The SCSI-3 draft standard allows a large number of IDs to be present on a SCSI bus, (0–255) with each SCSI device adapted to contain multiple (LUNs). These multiple LUNs are typically used by sophisticated tape and CD-ROM units that support multiple media. Accordingly, Linux's flavor of SCSI addressing is a four level hierarchy: <scsi(_adapter_number), channel, id, lun>, which is most commonly known and denoted with <host, bus, target, lun> encoding, i.e., (h0b0t0l0). Thus, a path from a SCSI host to a SCSI device, or to a logical unit represented by a LUN on a SCSI device, can be determined from the (h, b, t, l) address of a logical unit.

Storage area networking is predicated on the replacement of parallel SCSI transport with networked storage SCSI devices and tape SCSI devices behind the server or Linux Host. The vast majority of storage area networks (SANs) use a Fibre Channel (FC) medium for the underlying network transport and, at the upper layer, move data to and from disks with serial SCSI protocol, as described in the current draft SCSI Primary Commands-3 (SPC-3) document. The latest version of the SPC-3 document, found at ftp://ftp.t10.org/t10/drafts/spc3/spc3r09.pdf, provides SCSI primary command standards that are designed to be used industry wide. The combination of a high-speed transport (FC) with native SCSI protocol results in an efficient means to deploy servers, disk arrays, and tape subsystems and frees all components from the constraints of parallel SCSI architecture.

The SCSI-3 device driver supplied by the HBA vendor is responsible for mapping FC storage resources to the bus, target, lun conventions required by Linux. Since FC addresses are self-configuring, the mapping between port addresses, (which may change) and the upper level SCSI device driver designations are maintained by the HBA and the HBA's device driver interface to Linux.

The driver architecture and addressing within the SCSI Subsystem having been introduced, device names and their structure are now explained. A device name can be thought of as gateway to a Linux kernel driver (e.g., ULD sd, sr, st, sg) that controls a device rather than a gateway directly to the device itself. Hence there can be multiple device names, some of which may offer slightly different characteristics, all mapping to the same actual device.

The device names of the various SCSI devices may be found within the /dev directory. Traditionally in Linux, SCSI devices have been identified by their major and minor device number, rather than by their SCSI bus addresses (e.g. SCSI target ID and LUN). Eight block major numbers are reserved for SCSI disks: 8, 65, 66, 67, 68, 69, 70 and 71. Each major number can accommodate 256 minor numbers which, in the case of SCSI disks, are subdivided as follows in the following Table 1:

TABLE 1

Device Names for SCSI Disk Devices (sd) - Major No. 8

| | |
|---|---|
| [b,8,0] | /dev/sda |
| [b,8,1] | /dev/sda1 |
| ... | |
| [b,8,15] | /dev/sda15 |
| [b,8,16] | /dev/sdb |
| [b,8,17] | /dev/sdb1 |
| ... | |
| [b,8,255] | /dev/sdp15 |

In Table 1, the disk device names without a trailing digit refer to the whole disk (e.g. /dev/sda) while those with a trailing digit refer to one of the 15 allowable partitions within that disk. Linux supports up to 15 partitions per virtual whole disk, so the minor number serves to distinguish partitions form each other. Further, the disk device names without a trailing digit refer to the whole disk (e.g. /dev/sda) while those with a trailing digit refer to one of the 15 allowable partitions within the disk.

Table 2 illustrates naming conventions for the remaining seven SCSI disk block major numbers. The remaining 7 SCSI disk block major numbers (e.g., 65, 66, 67, 68, 69, 70 and 71 follow a similar pattern:

TABLE 2

SCSI Disk Devices (sd) Names - Remaining Major Nos.

| | |
|---|---|
| [b,65,0] | /dev/sdq |
| [b,65,1] | /dev/sdq1 |
| ... | |
| [b,65,159] | /dev/sdz15 |
| [b,65,160] | /dev/sdaa |
| [b,65,161] | /dev/sdaa1 |
| ... | |
| [b,65,255] | /dev/sdaf15 |
| [b,66,0] | /dev/sdag |
| [b,66,1] | /dev/sdag1 |
| ... | |
| [b,66,255] | /dev/sdav15 |
| ... | |
| [b,71,255] | /dev/sddx15 |

Accordingly, based on Tables 1 and 2, there are 128 possible disks that are allowed in Linux (i.e. /dev/sda to /dev/sddx), each having up to 15 partitions.

SCSI CD-ROM devices are allocated the block major number of 11. Traditionally "sr" has been the device name, but "scd" probably is more recognizable and is favored by several recent distributions. As shown in Table 3, in Linux, 256 SCSI CD-ROM devices are allowed.

TABLE 3

Device Names for SCSI CDROM Devices (scd/sr)

| | | |
|---|---|---|
| [b,11,0] | /dev/scd0 | [or/dev/sr0] |
| [b,11,255] | /dev/scd255 | [or/dev/sr255] |

SCSI tape devices (st) are allocated the char major number of 9. Up to 32 tape devices are supported in Linux, each of which can be accessed in one of four modes (0, 1, 2 and 3), with or without rewind. Device names for the st devices may be allocated as described in Table 4.

TABLE 4

Device Names for SCSI Tape Devices (st)

| | | |
|---|---|---|
| [c,9,0] | /dev/st0 | [tape 0, mode 0, rewind] |
| [c,9,1] | /dev/st1 | [tape 1, mode 0, rewind] |
| ... | | |
| [c,9,31] | /dev/st31 | [tape 31, mode 0, rewind] |
| [c,9,32] | /dev/st01 | [tape 0, mode 1, rewind] |
| ... | | |
| [c,9,63] | /dev/st311 | [tape 31, mode 1, rewind] |
| [c,9,64] | /dev/st0m | [tape 0, mode 2, rewind] |
| ... | | |
| [c,9,96] | /dev/st0a | [tape 0, mode 3, rewind] |
| ... | | |
| [c,9,127] | /dev/st31a | [tape 31, mode 3, rewind] |
| [c,9,128] | /dev/nst0 | [tape 0, mode 0, no rewind] |
| ... | | |
| [c,9,160] | /dev/nst01 | [tape 0, mode 1, no rewind] |
| ... | | |
| [c,9,192] | /dev/nst0m | [tape 0, mode 2, no rewind] |
| ... | | |
| [c,9,224] | /dev/nst0a | [tape 0, mode 3, no rewind] |
| ... | | |
| [c,9,255] | /dev/nst31a | [tape 31, mode 3, no rewind] |

The SCSI generic (sg) devices are allocated the char major number of 21. As shown in Table 5, there are 256 possible SCSI generic (sg) devices:

TABLE 5

Device Names for SCSI Generic Devices (sg)

| [c,21,0]   | /dev/sg0   |
| [c,21,1]   | /dev/sg1   |
| ...        |            |
| [c,21,255] | /dev/sg255 |

The SCSI generic device name's use of a trailing letter (e.g. /dev/sgc) is deprecated. Each SCSI disk (but not each partition), each SCSI CD-ROM and each SCSI tape is mapped to an sg device. SCSI devices that don't fit into these three categories (e.g. scanners) also appear as sg devices.

Device names, as embodied by their major and minor numbers, traditional device nodes and the current Linux implementation, have several limitations. Existing major and minor numbers are limited to 8 bits each. This is a limiting factor for some drivers, particularly the SCSI disk device driver, which originally consumed a single major number. Since 4 bits were assigned to the partition index (supporting 15 partitions per disk), this left 4 bits for the disk index. Thus, only 16 disks were supported.

A subsequent change in Linux reserved another seven major numbers for SCSI disks (sd), which has increased the number of supported disks to 128. but large storage arrays, such as RAID arrays, can currently present thousands of logical volumes. However, the current device node implementation stored on normal disk-based-systems in Linux limits the number of devices that can be accessed from user space. For targets (SCSI target devices) that support greater than 128 LUNs we cannot associate all the LUNs greater than 128 with a device node, and hence a physical device file because the Linux SCSI I/O subsystem cannot support more than 128 device nodes at any point in time.

In other words, the number of SCSI devices which may be detected from the user space is restricted to 128 (in the case of disk devices) and to 256 in the case of generic devices because of the current Linux device node implementation. What is needed is a method and arrangement that enables an application, such as a user application, to detect greater than 128 disk devices (sd), or greater than 256 generic devices (sg), so that the application may communicate with disk devices or generic devices in excess of the current limitation, without modifying the existing device drivers or the underlying Linux SCSI subsystem.

SUMMARY OF THE INVENTION

A method and arrangement, for use in a system having a host and one or more small computer system interface (SCSI) devices, are described for enabling a user application accessing the system to communicate with one or more of the SCSI devices. The user application, via an interface, queries a kernel component in the system for all SCSI devices in the system that are known to the kernel component. In response to the query, the kernel component prepares a buffer of virtual handles, where each virtual handle represents a known SCSI device, and forwards the buffer to the user application.

The user application then issues issuing a command which contains the virtual handles and command information to the kernel component. The kernel component compares the virtual handles to a list of SCSI device data structures of known SCSI devices, and transports the command to SCSI devices where there is a match between a virtual handle and a corresponding device data structure of the SCSI device. Thus, a communication path between the user application and one or more SCSI devices is established.

BRIEF DESCRIPTION OF THE DRAWINGS

The present invention will become more fully understood from the detailed description given here and below and the accompanying drawings which are given by way of illustration only, and thus are not limitative of the present invention, and wherein.

DETAILED DESCRIPTION

Traditionally in Linux, SCSI devices have been identified by their major and minor device number rather than their SCSI bus addresses (e.g. SCSI target id and LUN). Thus, the current Linux device node implementation limits the number of identifiable (detectable) SCSI devices to 128 SCSI disk (sd) devices or 256 SCSI generic (sg) devices. The method and arrangement of the invention serve to overcome the device node limitation in Linux. The method and arrangement provide a pass through capability by allowing a user application to directly talk to any SCSI device using virtual handles, thereby overcoming the device node limitation observed in standard Linux. Hence, a user mode application can talk to a very large number of SCSI devices.

The method and arrangement of the present invention provide a user library in user space that contains Application Programming Interfaces (APIs) that allow a user application (e.g., application in the user space) to transport any SCSI command to any SCSI device using virtual handles, irrespective of whether the device has a device file representation or not. In this way, a user application may access beyond 128 disk devices or 256 generic devices.

In order to allow the user application to talk to more than 128 disk devices or 256 generic devices without modifying the device drivers or the underlying SCSI subsystem, a filter driver is inserted into the SCSI subsystem between the ULD's and the mid-level SCSI The filter driver provides an application with a set of virtual handles in the form c<host_no>b<channel>t<scsi_id>l<lun>. Using these virtual handles, any SCSI command can be directed to the corresponding SCSI device at a specific (h, b, t, l). Since these handles do not have a device node association, and hence no physical device file limitation, the 128 device file limitation for disk devices or the 256 device file limitation for generic devices is rendered irrelevant.

Figure 2:
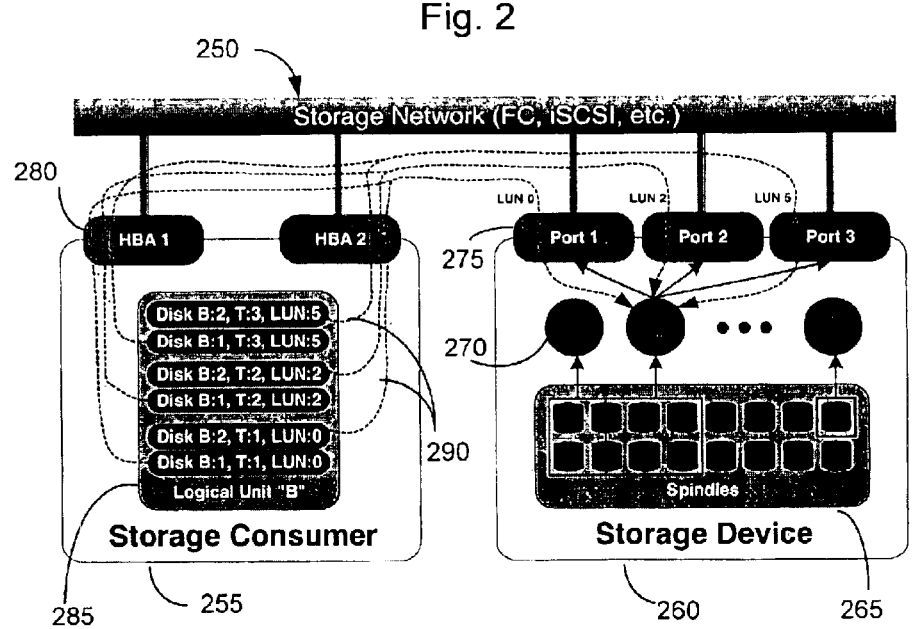
FIG. 2 depicts a hardware block diagram of a system according to an exemplary embodiment of the invention.

FIG. 2 depicts a hardware block diagram corresponding to a particular type arrangement in accordance with tan exemplary embodiment of the invention, namely a storage area network (SAN) 250. In this particular example, SAN 450 consists of a single storage consumer 255 (e.g., a host bus, a host computer, server, etc, e.g. "host") and a storage device 260 (e.g., RAID array, etc.); however, the present invention is envisioned for storage networks of any size and any number of storage consumers/storage devices. Storage consumer 255 may represent a SCSI host or SCSI initiator device, and storage device 260 may represent a SCSI target device. The devices described in SAN 250 may also be connected to a SCSI bus or fibre channel (FC) fabric (e.g. frame switching network or arbitrated loop), for example.

Storage device 260 may contain a number of disk spindles 265 (or some type of storage medium such as flash RAM, tape, etc.) that the storage device 260 uses to persistently store data for consumers of the storage device (e.g., storage consumer 255). Storage device 260 publishes internal storage to consumers by creating logical units 270 of storage using various methods that match with the storage consumer 255's needs. For example, logical units 270 may be stripped across multiple spindles 265 to improve throughput, logical units 270 may be mirrored across multiple spindles 265 for data resiliency.

FIG. 2 shows three such logical units 270, labeled LU "A", "B", and "C" that are constructed from some number of disk spindles 265. One or more storage consumers 255 may access a particular LU by communicating requests to a port 275 on storage device 260 and tagging the request with a port relative address, this is the logical unit number or LUN. In FIG. 2, LU B may be mapped out of three different ports 275 (e.g., SCSI target ports or "targets") by the storage device 260.

The dotted lines in FIG. 2 represent the various SCSI paths 290 from the host consumer 255 through SAN 250 to LU B. Internally, the consumer 255's operating system (OS) will create named objects to represent the blocks of storage the OS discovered (represented as "Disk B:# T:# LUN:#", analogous to the h,b,t,l path). In FIG. 2, the "host" (consumer 255) has six paths to LU B and has created six different OS objects that ultimately point to the same logical unit of storage. Block 285 denotes the fact that the contained named objects are all related to the exact same logical unit, in this example LU B.

Figure 3:
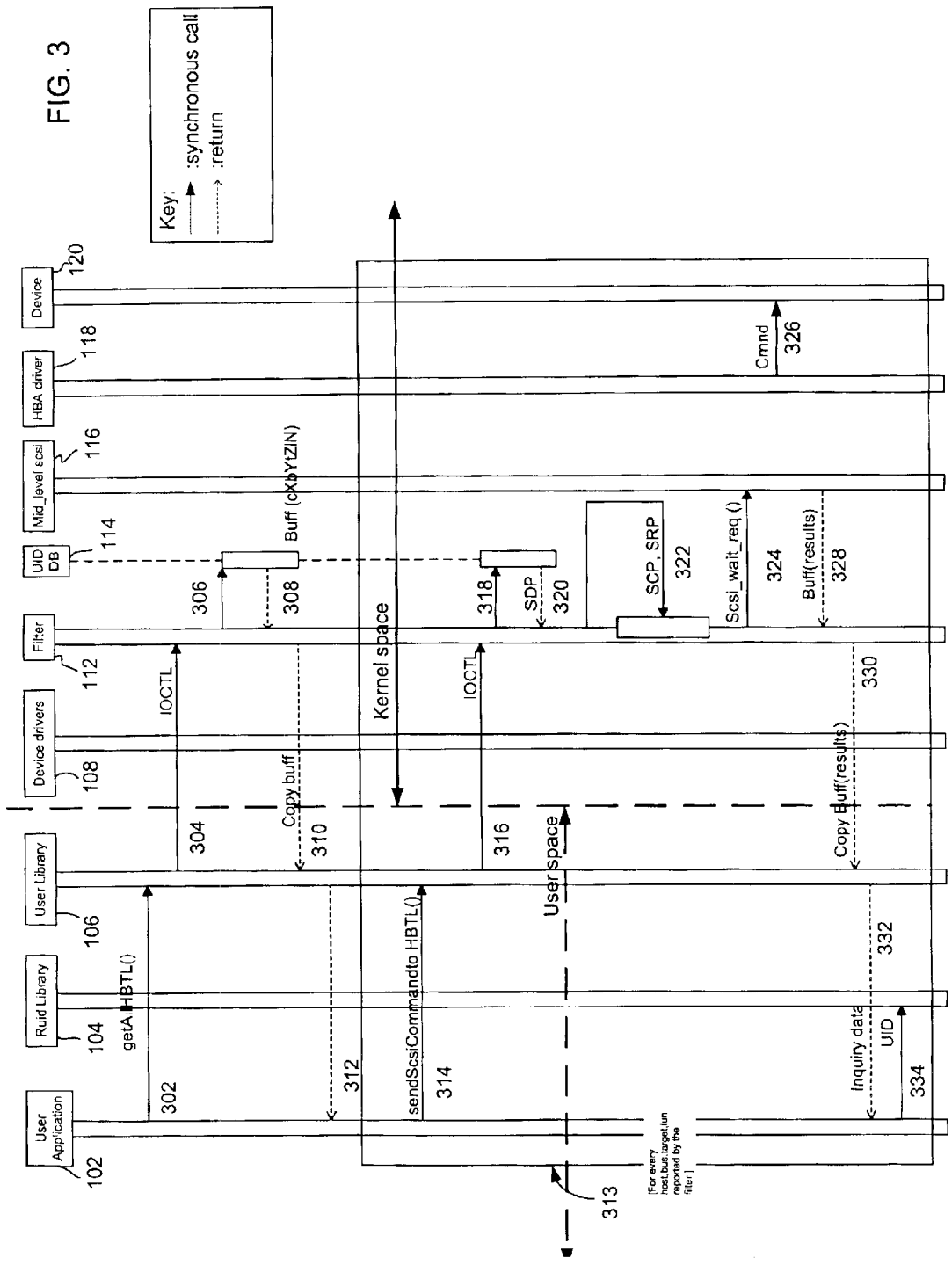
FIG. 3 is a sequence diagram according to unified modeling language (UML) principles illustrating a method and arrangement of communicating with SCSI devices in accordance with an exemplary embodiment of the invention.

FIG. 3 is a sequence diagram according to unified modeling language (UML) principles illustrating a method and arrangement of communicating with SCSI devices in accordance with an exemplary embodiment of the invention. FIG. 3 is designed to illustrate how a user application in user space can communicate with a vast number of SCSI devices, such as logical units 270 of storage device 260 within a SAN 250, in excess of the current standard limitation of 128 SCSI disk devices or 256 SCSI generic devices.

Sequence 300 in FIG. 3 depicts the various interactions between user space components and kernel space components within a SCSI subsystem. The user space includes a user application 102 and a RUID library 104, as well as a user library 106 that provides interfaces to the kernel space. The kernel space includes device drivers 108 (e.g., ULDs sd, st, sr, sg), a kernel component called a filter driver 112, a unique logical unit identifier database (UID DB 114), a mid-level SCSI driver 116, an HBA driver 118, and a device (e.g., SCSI device) 120 on a storage system such as a SAN. Device 120 may represent one or a plurality of SCSI devices, more particularly one or more logical units (represented by their LUNs) on a SCSI target device (target).

In a preferred embodiment, a kernel component, called a filter driver 112 is inserted into the SCSI subsystem in kernel space between the device drivers 108 and mid-level SCSI driver 116. The filter driver 112 will "intercept" commands from the user space that normally are directed to the device drivers 108 (e.g., ULDs sd, sr, st, sg). In Linux, each device driver type (sd, sr, st, sg) of the device drivers 108 that is known to the OS kernel (not shown) has its scsi_device_ template loaded by the kernel. The SCSI subsystem uses the scsi_device_template (s) to call various SCSI type driver routines (e.g., detect(0), init(0), finish(0), attach(0), detach (0) routines, etc.) for each type of SCSI device 120. However, the inserted filter driver 112 swaps its own driver routine entry points with the device drivers' 108 routines, i.e., swapping detect(0), attach(0), detach(0), finish(0) entry points of the disk, tape, generic device drivers with its own. Thus, the filter driver 112 may be called by the user application 102, which also has a copy of the device structures, called scsi_device data structures, which pertain to all LUNs of a discovered device 120. In a standard Linux implementation, these scsi_device structures to all LUNs of a discovered device 120 would have been under the exclusive control of the device drivers 108.

Specifically, the filter driver 112 looks where these entry points are stored in device drivers 108, saves a copy for itself, and then overwrites them with its own entry points. That way, the filter driver 112's routines would be called instead of the standard ULDs routines. The filter driver 112 may still call the routines of the other upper layer drivers (device drivers 108) if one or more of them are to control a particular LUN (device 120). Accordingly, any call for a driver routine will be intercepted by filter driver 112.

The filter driver 112, which is an upper level driver (ULD), will create what is called a /proc entry point for itself, so that it may receive IOCTLs from user application 102, via user library 106, which supports interfaces to the kernel space. In other words, the filter driver 112 creates a point of communication between the user mode space and the kernel mode space for the user application 102 to send commands across to the kernel space.

Referring to FIG. 3, user application 102 calls (302) a function getAllHBTL(0) in user library 106, which issues an IOCTL call (304), called IOCTL_GET_ALL_HBTL, that is directed towards the /proc entry of the filter driver 112. The getAllHBTL(0) function is one of two API's used by user application 102. The IOCTL_GET_ALL_HBTL is used to get all h, b, t, l info of all SCSI devices 120 that the filter driver 112 knows of in the SCSI subsystem.

The filter driver 112 has built, in advance, its own unique logical unit identifier database (UID DB) 114. The UID DB 114 may consist of a table of in-memory mappings of the scsi_device_pointer (SDP) of each LUN (e.g., device 120) that is known to the filter driver 112, to a unique logical unit identifier (UID). A SDP is a pointer to a scsi_device data structure, which is a data structure that includes host#, bus#, target# (SCSI ID), and LUN fields, (e.g., the h, b, t, l address) to a LUN (logical unit). The UID is a unique identifier, created by the filter driver 112 and maintained in LID DB 114, that is independent of the h, b, t, l path mapping to the LUN (logical unit) of a known device 120. In other words, it is another mechanism by which to identify or detect a device 120 in the SCSI subsystem. The in-memory mappings of SDPs-to-UIDs are stored in a "hash map" In response to the IOCTL call 304, the filter driver 112 attempts to "walk through" the SDPs (at 306) for each UID in the hash map of the UID DB 114, so as to construct a buffer (return 208) of <host, bus, target, lun> values for each SDP, essentially parsing out the (h, b, t, l) fields from each known SDP in the hash map.

The IOCTL call 304 is actually invoked twice in succession: the first time to get the buffer size required (from filter driver 112) to hold the (h, b, t, l) addresses parsed out of the UID DB 114 by the filter driver 112, and the second time to get the h, b, t, l addresses themselves. Each entry in the buffer is a 32 bit-word consisting of four 8-bit fields (which is converted to a string in user library 106) that may be in a format cXbYtZlN where the "c" represents that host information is in the first 8-bit field (portion) of the word, with X being host number, the "b" representing that bus (channel) information is in the next 8-bit field and Y the bus (channel) number, "t" representing that target (SCSI ID) information is in the next 8-bit field with Z being the target number (SCSI ID), and "l" representing that lun information is in the final 8-bit field with N being the logical unit number (e.g., LUN "5").

The cXbYtZlN is what is called a "virtual handle". Virtual handles enable the user application 102 to access and communicate with a number of SCSI devices in excess of the 128 disk or 256 generic device limitations in standard Linux. In essence, the virtual handles represent a replacement for (or alternative to) a standard device file name, but are not subject to the limitations of device files (e.g., where the number of accessible devices is limited by the device's minor number). The reason for this is that a virtual handle refers to the target (SCSI id) and lun of a SCSI device 120, rather than to the minor number, of a SCSI device.

Accordingly, any SCSI command can be directed to a corresponding SCSI device at a specific (h, b, t, l) using the cXbYtZlN virtual handle. Since these virtual handles do not have a device node association, there is no device file limitation, so the 128 device file limitation for disk devices or the 256 device file limitation for generic devices are not applicable.

The filter driver 112 returns (310) the buffer of virtual handles (in word form) to the user library 106, and the user library returns (312) the buffer of virtual handles (after converting the virtual handles to string form) to user application 102. Now that the user application 102 has all the cXbYtZlN virtual handles that represent each known SDP, which point to known devices 120, the user application 102 may send any SCSI command to any of these devices 120, even though the actual number of devices 120 may exceed the standard Linux limitations.

Referring to FIG. 3, user application 102 builds an inquiry command and calls (314) a function "sendScsiCommandToHBTL" in user library 106. This function is utilized in order to transport SCSI commands to devices 120 and get back data and status from the devices 120. When the function is called to the user library 106, it issues an IOCTL call 316 (called IOCTL_SEND_SCSI_COMMAND) that is directed towards the /proc entry of the filter driver 112. The IOCTL_SEND_SCSI_COMMAND is the second API used by user application 102. The IOCTL call 316 includes a parameter which is a pointer to a transport structure which contains the (h, b, t, l) address at which the SCSI command is to be sent. The transport structure may be configured as shown below.

```
typedef struct
{
    unsigned int host;// the host info of the lun in question . . .
    unsigned int channel; // the bus info of the lun in question . . .
    unsigned int id;    // the tgt info of the lun in question . . .
    unsigned int lun;   // the lun info of the lun in question . . .
    unsigned char * scsi_cmd;
    int cmd_len; // the argument as passed to the sg ioctl call . . .
    unsigned char * scsi_result;
    int result_len;
```

-continued

```
    unsigned char * sense_buffer;
    int timeout;
    int result_status;
    int data_direction;
} transport_info;
```

The (h, b, t, l) information is obtained by parsing the virtual handles returned from the IOCTL_GET_ALL_HBTL call 304. The structure being passed as a parameter to the IOCTL call 316 may include, in addition to the (h, b, t, l) information, the SCSI command structure for the actual SCSI command (as described in the SCSI-2 command standard) that is to be sent, data direction parameters to indicate whether data is to be sent to or received from devices 120, a pre-allocated result buffer that is to contain device 120 data returned from the SCSI command, a pre-allocated sense buffer that is to contain information relating to why a SCSI command did not reach an intended device 120, a timeout value that indicates when the SCSI command times out in the event data is not returned from a device 120, and other values.

Accordingly, the filter driver 112 must be configured so as to be able to transport the SCSI command through the mid-level SCSI driver; this entails creating a SCSI request pointer (SRP) (at 322). The filter driver 112 parses the cXbYtZlN from the IOCTL call 316 and searches (318) through SDPs in UID DB 114 to find an SDP which has an (h, b, t, l) address that matches the virtual handle. If there is a match, the SDP is returned (320) to the filter driver 112. It is to be understood that the SDP could already have a device file name (e.g., /dev/sdaa, /dev/sg3, etc) association in the file system space. If so, that device file may also be opened to talk to the device. In such a case, an IOCTL called SCSI_IOCTL_SEND_COMMAND may be directed towards any one of the device drivers 108 (ULDs), with the SCSI command to be sent as a parameter Even if there is no associated device file name, the user application 102 is able to send the SCSI command to (and communicate with) a device 120.

The returned SDP is used to create an SRP. Creation of a SRP is necessary in order to transport the user supplied SCSI command to the SCSI device 120 using the mid-level SCSI driver 116. The SRP is created by calling a exported mid-level SCSI function called scsi_allocate_request(0), with the SDP as a parameter. This function dynamically creates a structure scsi_request data structure. The SRP is a pointer to that scsi_request data structure. The mid-level SCSI driver 116 stores a reference to the SDP in the scsi_request structure.

The filter driver 112 also creates a scsi_cmnd data structure, and a SCSI command pointer (SCP) points to the scsi_cmnd structure. The scsi_cmnd structure is an exported data structure that is contained in kernel memory and is part of the underlying SCSI Subsystem. Thus, it is always available to the filter driver 112. The scsi_cmnd data structure is added to a device queue of scsi_device structure of a device 120 using the SDP. A command length of the SRP is set to a user-supplied command length cmd_len from the transport_info structure value described above with respect to IOCTL (316). A data direction field in the SRP is also set to the data_direction field in the transport_info structure.

Additionally, the scsi command structure for the actual SCSI command, result buffer, timeout value, etc., are passed as parameters to a mid-level scsi function scsi_wait_req.

This function is used to transport the user supplied SCSI command to the scsi_wait_req function. The scsi_wait_req function uses the following arguments to send all SCSI commands out to low level drivers (HBA driver 118): SRpnt (request descriptor, e.g., this is the SRP); cmnd (the actual SCSI command to be performed); buffer (the result buffer that is to contain the data return from the SCI command); bufflen (size of the result buffer); done (a completion function to be run); timeout (how long to let SCSI command "run" before timeout); and retries (number of allowable retries to device 120). In turn, HBA driver 118 transports (326) the SCSI command, initiated from user application 102, to a SCSI device 120, since the HBA driver provides the hardware interface to a SCSI device.

The filter driver 112 waits for a command to complete (e.g., done), which is called by the mid-level SCSI driver 116, and receives a return (328) from device 120, via mid-level SCSI driver 116. The return could be a result buffer full of data requested by user application 102, or a sense buffer containing data indicating why the SCSI command was not completed by device 120. The filter driver 112 copies the result/sense buffer (330) from the SRP to a sense_buffer supplied by the user application 102 that is contained within a field of the transport_info structure. A command status is copied back to a result_status field of the transport _info structure. The transport info structure is passed back to the user library 106, since the user library 106 provides the interface between a component in the kernel space and one in the user space. In turn, the user library 106 forwards the results to the user application 102.

As an exemplary application, the user library 106 may return inquiry data, if the scsi_cmnd data structure sent via function "sendScsiCommandToHBTL" from user application 103 was in the form of a SCSI INQUIRY command. The user application 102 may parse the inquiry data, which may be payload from one or more of a Device Identification Vital Product Data Page (VPD 83h), Unit Serial Number Vital product Data page (VPD 80h), and a standard inquiry data page returned from device 120, to see if there is any identifying data of device 120 that is considered unique. To do so, it may invoke an RUID library 104 in user space, which is a set of compiled programs or procedures that dynamically (in real time) generates and returns a UID, in user space, to user application 102.

The RUID library 104 receives (332) the inquiry data in order to compute or generate a unique identifier (UID) in the user space. The creation of a UID may be accomplished as described in co-pending U.S. patent application Ser. No. 10/260415 (to Erickson et al., entitled METHOD AND ARRANGEMENT FOR GENERATING UNIQUE IDENTIFIERS FOR SCSI LOGICAL UNITS, filed on Oct. 1 2002, the contents of which are hereby incorporated by reference in their entirety. For example, the UID library 104 may concatenate a product serial number field and one or more of the vendor identification, product identification, product revision level, and peripheral device type fields from received standard inquiry page data to identifier data found and cached in the VPD 83h page and/or VPD 80h page payload. The resultant identifier for the logical unit (LUN) is a globally unique identifier (UID) that is independent of vendor, product, path and logical unit type (e.g. random access magnetic disk, sequential access magnetic tape, etc.). The UID library 104 utilizes the generated UID in order to create a UID-based file name. The UID-based file name is independent of the (h, b, t, l) path, and provides a persistent identifier for a device 120 (such as a LUN (logical unit)).

Figure 1:
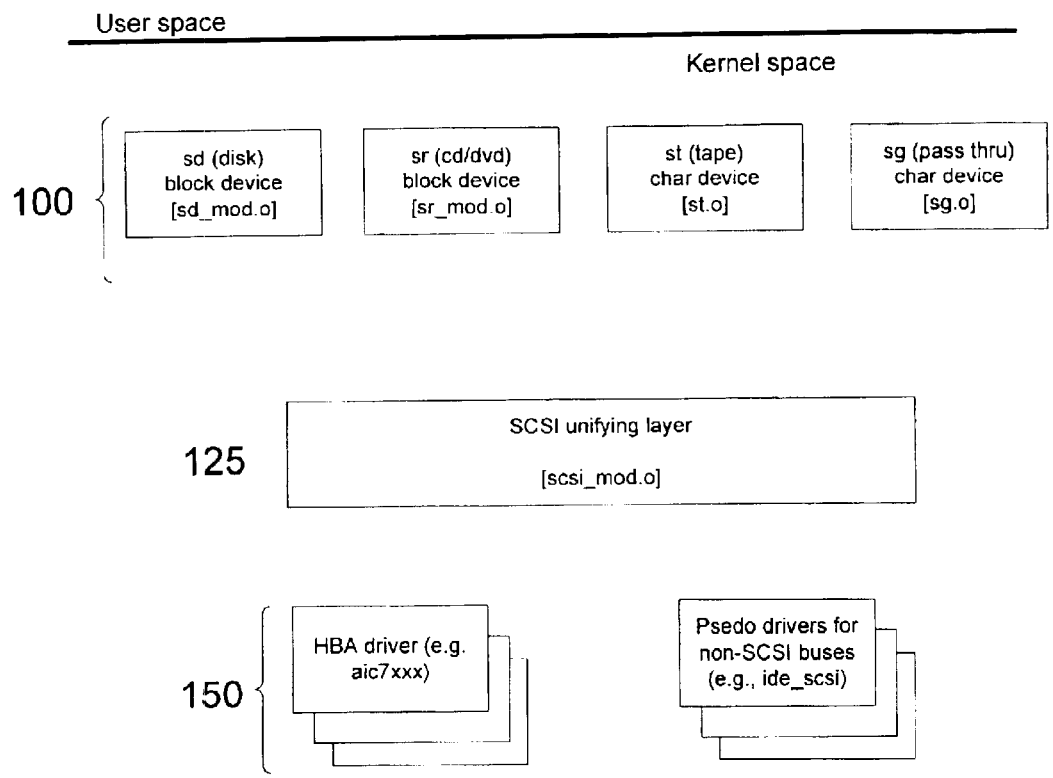
FIG. 1 illustrates a driver architecture for the Linux SCSI I/O Subsystem.

The invention having been thus described the invention may be varied in many ways. For example, the functional blocks in FIGS. 1–3 may be implemented in hardware and/or software. The hardware/software implementation may include a combination of processors, application service providers, application specific integrated circuits (ASICs) and/or articles of manufacture. The articles of manufacture may further include storage media and executable computer program. The executable computer program may include the instructions to perform the described operations. For example, the computer program may be a product that includes a computer-readable medium having computer program logic stored thereon for enabling a processor of the product to communicate with SCSI devices. The computer executable programs may also be provided as part of externally supplied propagated signals. Such variations are not to be regarded as a departure from the spirit and scope of the invention, and all such modifications as would be obvious to one skilled in the art are intended to be included within the scope of the following claims.

What is claimed:

1. A method, for use in a system having a host and one or more small computer system interface (SCSI) devices, the method enabling a user application accessing the system to communicate with one or more of the SCSI devices, comprising the steps of:

querying a kernel component in the system for all SCSI devices in the system that are known to the kernel component;

preparing a buffer of virtual handles at the kernel component in response to the querying step, each virtual handle representing a known SCSI device;

forwarding the buffer to the user application;

issuing a command data structure to the kernel component, the command data structure containing the virtual handles and command information;

comparing, at the kernel component, each virtual handle to a list of SCSI device data structures of said SCSI devices known to the kernel component, and transporting the command data structure to SCSI devices, when there is a match between a virtual handle and a corresponding device data structure of a SCSI device.

2. The method of claim 1, wherein said transporting step establishes a communication path between the user application and the SCSI devices.

3. The method of claim 1, wherein the preparing step further comprises parsing a list of known SCSI device pointers (SDP), each SDP pointing to a one of said known SCSI devices;

extracting SCSI address information to the SCSI device from each of the known SDPs; and converting each extracted SCSI address information into a virtual handle; and building said buffer with said virtual handles.

4. The method of claim 3, wherein said extracting step includes extracting host, bus, target and logical unit number (lun) information, (h, b, t, l) from each known SDP, each (h, b, t, l) address indicating a path from the host to a SCSI device in the system.

5. The method of claim 4, wherein said converting step includes adding an identifier to each (h, b, t, l) to create a virtual handle in a form cXbYtZlN, where c represents an identifier indicating host information with X being a host number (h) in the (h, b, t, l) address, b representing an identifier indicating bus information with Y being a bus number (b) in the (h, b, t, l) address, t representing an identifier indicating target information with Z being a target number (t) in the (h, b, t, l) address, and l representing an identifier indicating lun information with N being the (lun) in the (h, b, t, l) address.

6. The method of claim 1, wherein the comparing step further comprises,
parsing a list of known SCSI device pointers (SDP) at the kernel component, each SDP being a device data structure that points to one of said known SCSI devices and including SCSI address information which indicates a path said one known SCSI device; and
matching the virtual handle to SCSI address information in at least one SDPs.

7. The method of claim 6, wherein said transporting step includes
using SDPs resulting from said matching step in order to transport a command data structure to one or more SCSI devices, wherein the command data structure contains a SCSI command requesting data from a SCSI device.

8. The method of claim 1, wherein the command data structure contains a SCSI command requesting data from a SCSI device, and wherein the virtual handle is useable to transport the SCSI command to a SCSI device that has an associated device file name.

9. The method of claim 1, wherein the command data structure contains a SCSI command requesting data from a SCSI device, and wherein the virtual handle is useable to transport the SCSI command to a SCSI device that does not have an associated device file name.

10. The method of claim 1, wherein said SCSI devices include at least one or more of SCSI disk (sd) devices and SCSI generic (sg) devices, and wherein the user application communicates with a number of SCSI devices in excess of a Linux limitation of 128 sd devices or 256 sg devices.

11. An arrangement in a system having a host and one or more small computer system interface (SCSI) devices, the arrangement enabling a user application accessing the system to communicate with one or more of the SCSI devices, comprising:
means for querying a kernel component in the system for all SCSI devices in the system that are known to the kernel component;
means for preparing a buffer of virtual handles at the kernel component in response to the querying step, each virtual handle representing a known SCSI device;
means for forwarding the buffer to the user application;
means for issuing a command data structure to the kernel component, the command data structure containing the virtual handles and command information;
means for comparing, at the kernel component, each virtual handle to a list of SCSI device data structures of said SCSI devices known to the kernel component, and
means for transporting the command data structure to SCSI devices, when there is a match between a virtual handle and a corresponding device data structure of a SCSI device.

12. The arrangement of claim 11, wherein a communication path is established between the user application and the SCSI devices when the command data structure is received by the SCSI devices.

13. The arrangement of claim 11,
wherein the means for querying further includes a user interface for issuing an input/output control call (IOCTL) to the filter component to return identifier information for all devices known to the kernel component, and
wherein the kernel component is a filter driver adapted to be inserted into the system to intercept commands, via the interface, from the user application in order to facilitate communication between the user application and SCSI devices in the system.

14. The arrangement of claim 11,
wherein the means for preparing further includes the kernel component searching a database containing a list of known SCSI device pointers (SDP), each SDP pointing to a one of said known SCSI devices; extracting SCSI address information to the SCSI device from each of the known SDPs in the database, and converting each extracted SCSI address information into a virtual handle that it inserts in the buffer.

15. The arrangement of claim 14, wherein the SCSI address information is host, bus, target and logical unit number (lun) information, (h, b, t, l) of each known SDP, each (h, b, t, l) address indicating a path from the host to a SCSI device in the system.

16. The arrangement of claim 14, wherein the kernel component adds an identifier to each (h, b, t, l) to create a virtual handle in a form cXbYtZlN,
where c represents an identifier indicating host information with X being a host number (h) in the (h, b, t, l) address, b representing an identifier indicating bus information with Y being a bus number (b) in the (h, b, t, l) address, t representing an identifier indicating target information with Z being a target number (t) in the (h, b, t, l) address, and l representing an identifier indicating lun information with N being the (lun) in the (h, b, t, l) address.

17. The arrangement of claim 11, wherein the means for comparing further includes the kernel component searching a database of known SCSI device pointers (SDP), each SDP being a device data structure that points to one of said known SCSI devices and including SCSI address information which indicates a path said one known SCSI device, and the kernel component matching the virtual handle to SCSI address information in at least one SDP.

18. The arrangement of claim 11, wherein the command data structure contains a SCSI command requesting data from a SCSI device, and wherein the virtual handle is useable to transport the SCSI command to a SCSI device that has an associated device file name.

19. The arrangement of claim 11, wherein the command data structure contains a SCSI command requesting data from a SCSI device, and wherein the virtual handle is useable to transport the SCSI command to a SCSI device that does not have an associated device file name.

20. The arrangement of claim 11, wherein said SCSI devices include at least one or more of SCSI disk (sd) devices and SCSI generic (sg) devices, and wherein the user application communicates with a number of SCSI devices in excess of a Linux limitation of 128 sd devices or 256 sg devices.

21. A computer program product, for use in a system having a bus, a host connected to the bus, and one or more small computer system interface (SCSI) devices connected to the bus, the computer program product comprising a computer-readable medium having computer program logic stored thereon for enabling a processor of the product to allow a user application accessing the system to communicate with one or more of the SCSI devices, the computer program logic causing the processor to perform the steps of:

querying a kernel component in the system for all SCSI devices in the system that are known to the kernel component;

preparing a buffer of virtual handles at the kernel component in response to the querying step, each virtual handle representing a known SCSI device;

forwarding the buffer to the user application;

issuing a command data structure to the kernel component, the command data structure containing the virtual handles and command information;

comparing, at the kernel component, each virtual handle to a list of SCSI device data structures of said SCSI devices known to the kernel component, and transporting the command data structure SCSI devices, where there is a match between a virtual handle and a corresponding device data structure of a SCSI device, so as to establish a communication path between the user application and the SCSI devices.

* * * * *